Oct. 16, 1934.  D. MACKENZIE  1,977,392
AIRCRAFT
Filed Jan. 31, 1933   5 Sheets-Sheet 1
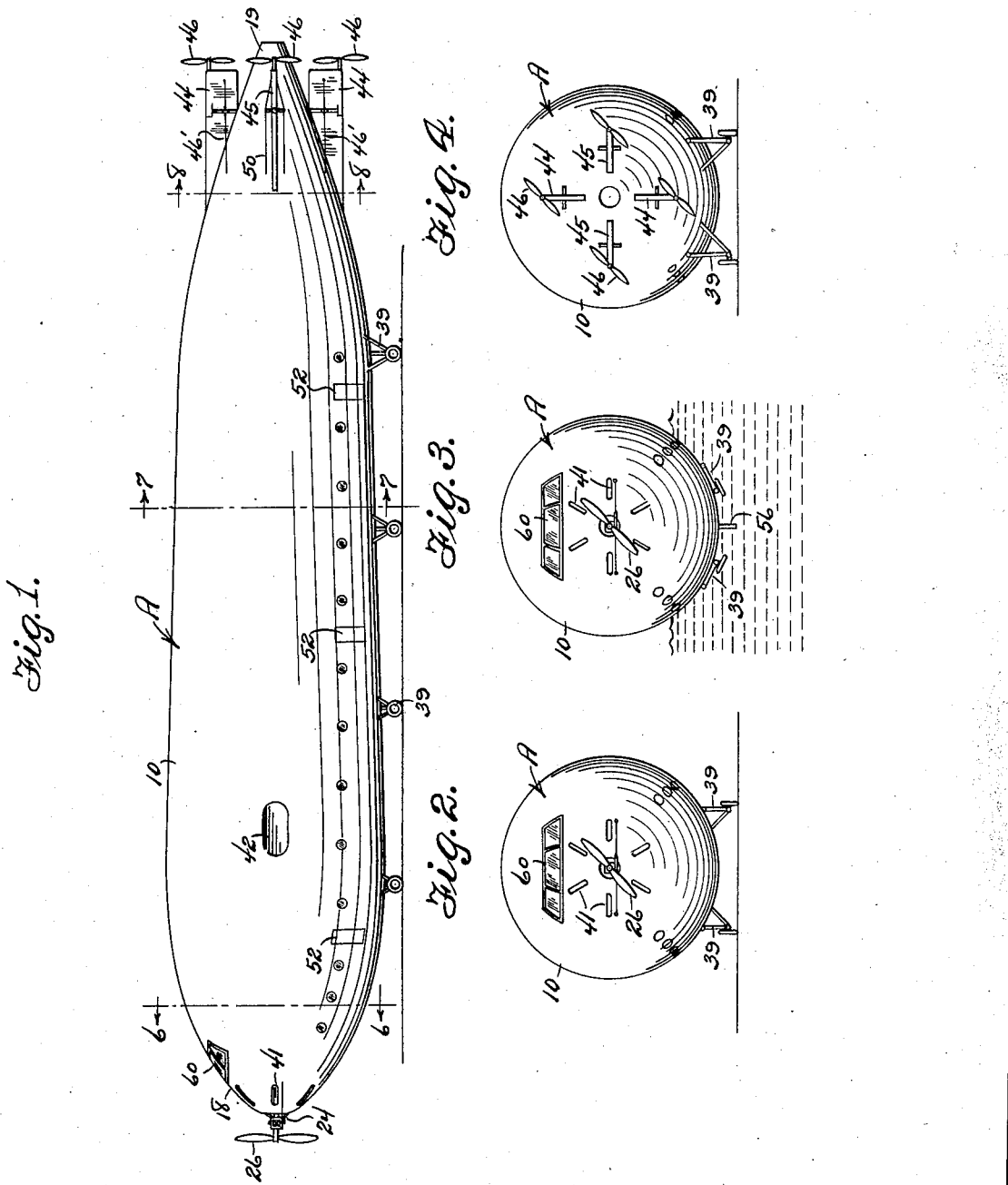
Donald Mackenzie
INVENTOR
BY Victor J. Evans & Co.
ATTORNEY

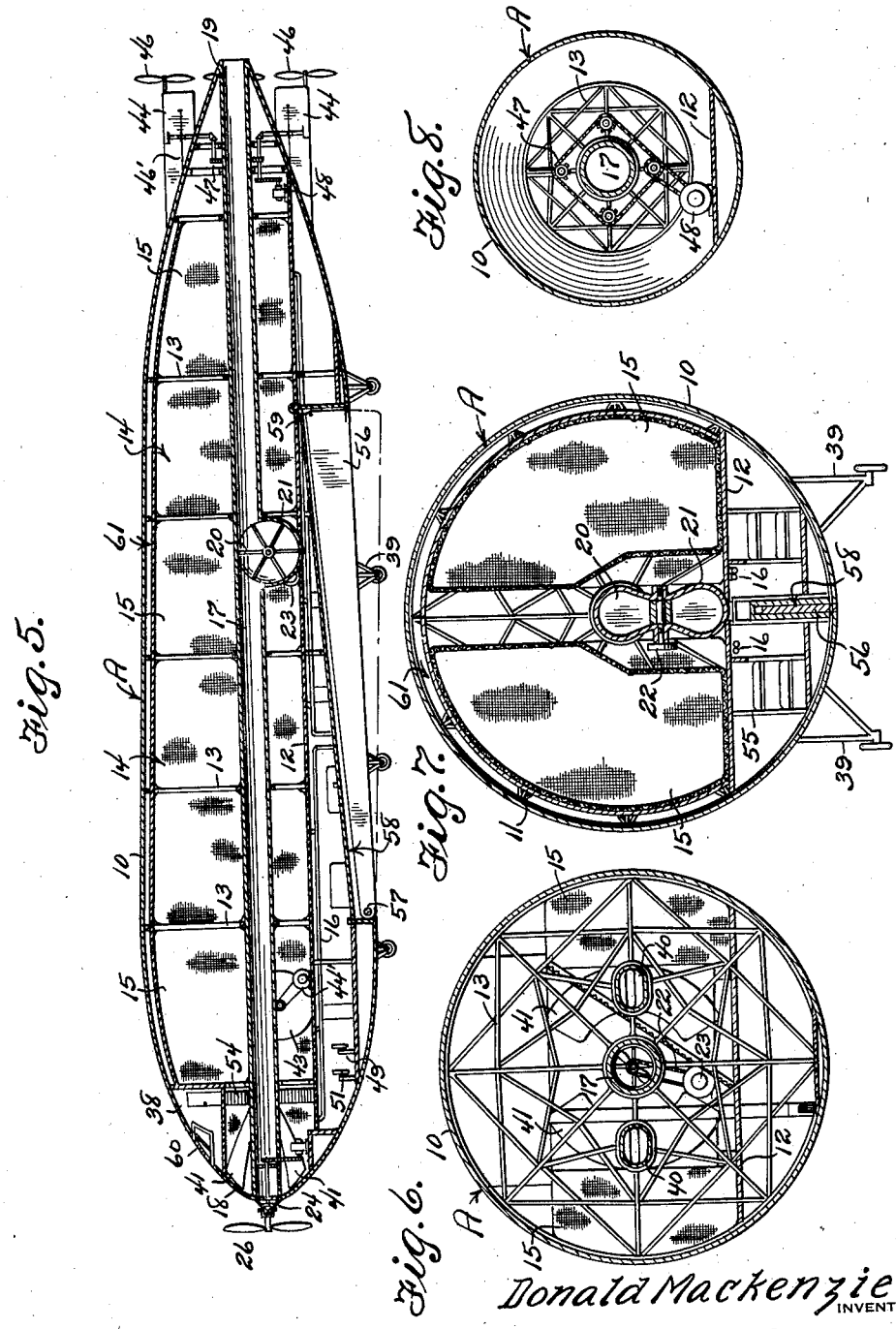

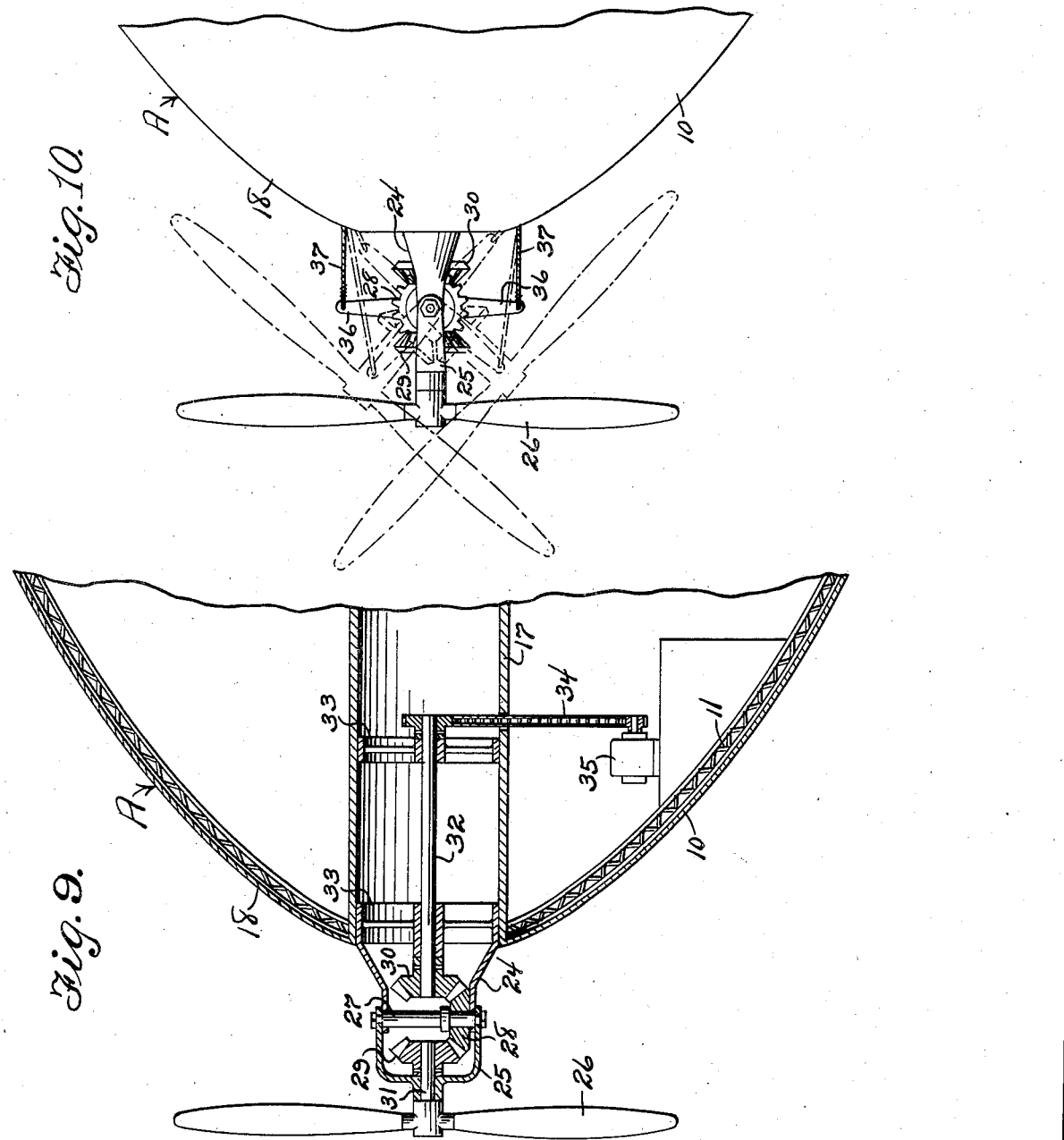

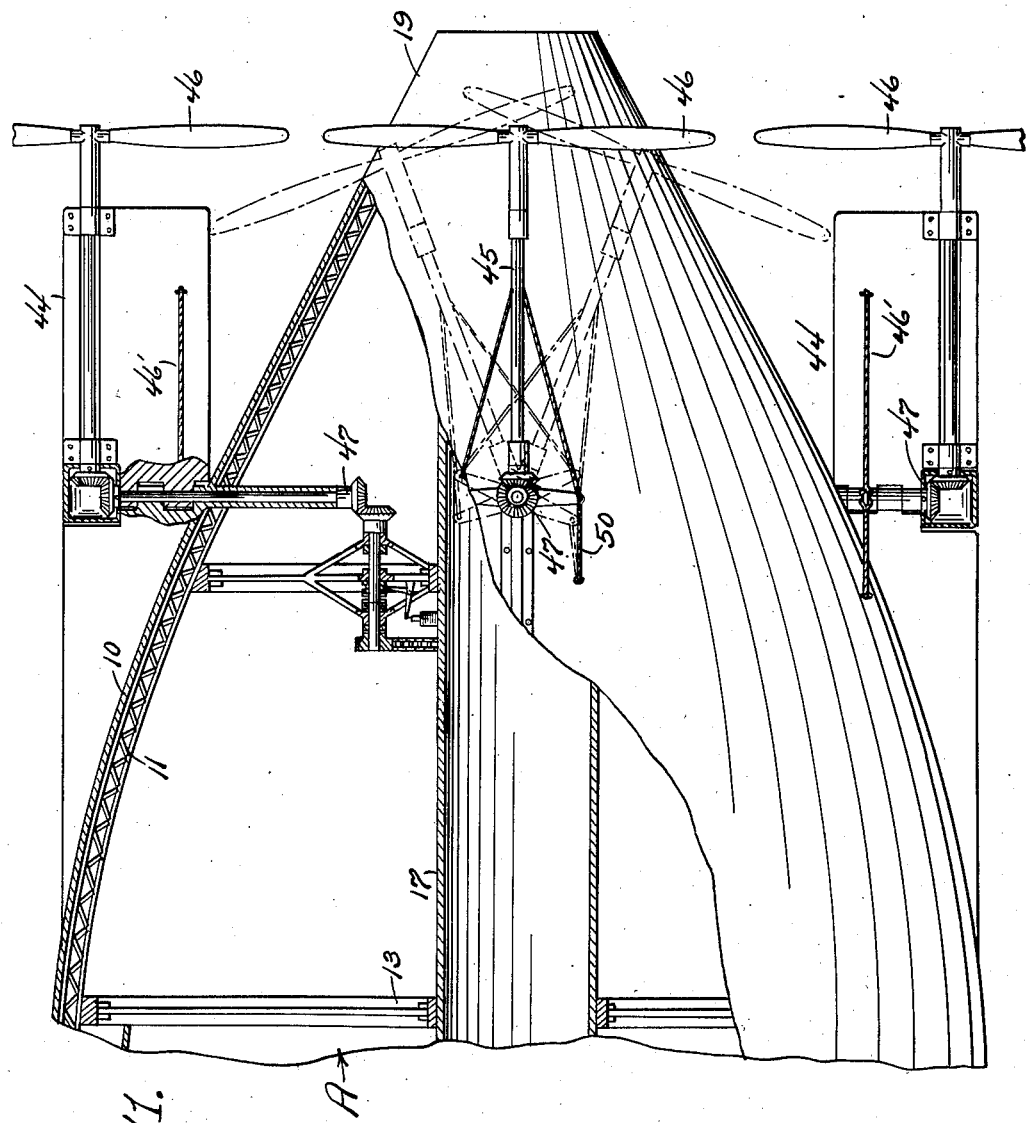

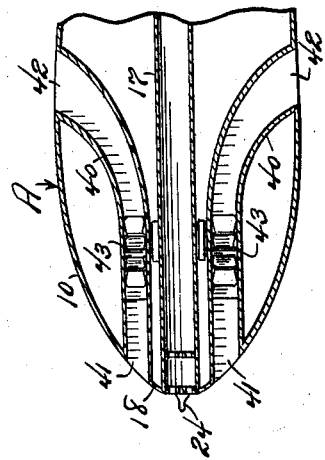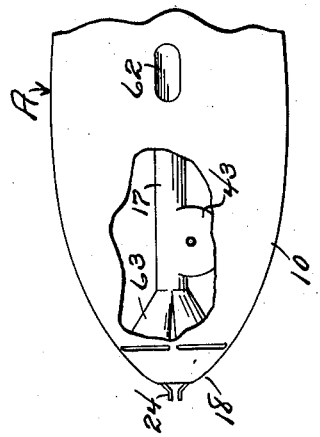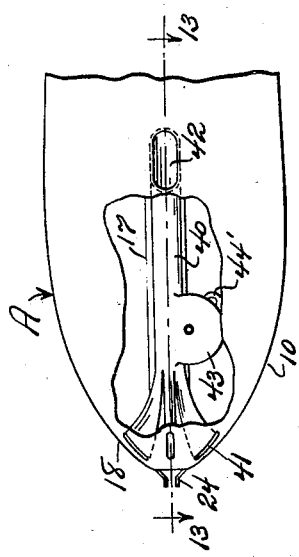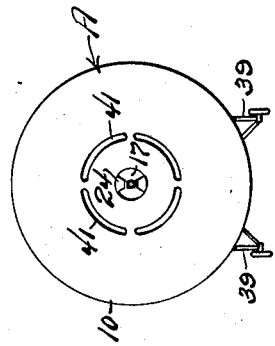

Patented Oct. 16, 1934

1,977,392

UNITED STATES PATENT OFFICE 1,977,392

AIRCRAFT

Donald Mackenzie, Los Angeles, Calif.

Application January 31, 1933, Serial No. 654,493

2 Claims. (Cl. 244—6)

The invention relates to aircraft and more especially to dirigibles or lighter-than-air ships.

The primary object of the invention is the provision of a ship of this character, wherein in its design it will give greater speed than obtainable from ships of a like kind now in use and will be less difficult to steer and maintain on an even keel.

Another object of the invention is the provision of a ship of this character, wherein the propelling means therefor is located at the nose or front end and is mounted so that the same besides propelling the ship may be actuated for aiding in steering.

A further object of the invention is the provision of a ship of this character wherein the construction thereof is such as to eliminate skin resistance and at the same time increase the speed of the ship.

A still further object of the invention is the provision of a ship of this character, wherein independent gas pockets or compartments are provided for helium or other like gases so that damage to any one compartment or pocket will not affect the other, thus permitting the gas within the damaged compartment or compartments to maintain the ship afloat.

A still further object of the invention is the provision of a ship of this character wherein means is providid for compressing the helium or like gases so that descent of the ship may be quickly accomplished and which compressed gases may be again released when desired to ascend.

A still further object of the invention is the provision of a ship of this character wherein a dead air space between the gas compartments and the skin of the ship is provided whereby the gases may be more easily protected from varying temperatures and if desired the dead air space may be heated to maintain the gas or gases at a predetermined temperature regardless of the varying temperatures exteriorly of the ship.

A still further object of the invention is the provision of a ship of this character wherein its frame or body construction is capable of affording maximum strength and provides considerable space within the ship for the gas compartments, equipment, fuel storage, loads, both merchandise and passenger, ship operators and everything within the walls of the ship and also wind resistance is reduced so that the ship will have much easier maintenance on an even keel.

A still further object of the invention is the provision of a ship of this character, wherein its body is so constructed that it will enable the ship to descend on water with safety and by having the ship of this type it will provide greater safety when crossing large spans of water and will be more useful for rescue work than other like types.

A still further object of the invention is the provision of a ship of this character wherein the propelling means of the ship which is located on the elevators at the rear end thereof besides propelling the ship may be actuated for steering.

A still further object of the invention is the provision of a ship of this character which is comparatively simple in construction, thoroughly reliable and efficient in its purposes, strong, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is an elevation of a ship constructed in accordance with the invention.

Figure 2 is a front elevation looking toward the front or nose end thereof.

Figure 3 is a view similar to Figure 2 showing the ship's body afloat upon water.

Figure 4 is a rear elevation looking toward the rear or tail end thereof.

Figure 5 is a vertical longitudinal sectional view through the ship.

Figure 6 is an enlarged sectional view on the line 6—6 of Figure 1 looking in the direction of the arrows.

Figure 7 is a sectional view on the line 7—7 of Figure 1 looking in the direction of the arrows.

Figure 8 is a sectional view on the line 8—8 of Figure 1 looking in the direction of the arrows.

Figure 9 is a fragmentary enlarged vertical longitudinal sectional view through the nose or front end of the ship.

Figure 10 is a fragmentary top plan view showing by full lines the normal position of the propeller and by dotted lines the adjusted positions thereof.

Figure 11 is a fragmentary side elevation of the ship at the rear or tail end, the same being partly in section and showing by full lines the tail propellers and by dotted lines the adjusted position of certain of the same.

Figure 12 is a fragmentary elevation partly broken away showing in detail the air tunnel arrangement of the ship.

Figure 13 is a sectional view on the line 13—13 of Figure 12 looking in the direction of the arrows.

Figure 14 is a front elevation of a modified form of that structure shown in Figure 12.

Figure 15 is a view similar to Figure 12 partly broken away and showing the modified form of construction in Figure 14.

Similar reference characters indicate corresponding parts throughout the several views in the drawings.

Referring to the drawings in detail the ship in its form of a dirigible or lighter-than-air craft comprises a body A preferably of the shape shown in Figure 1 of the drawings although it may be otherwise shaped and includes an outer skin 10 enveloping a framing 11, this being of any approved make-up to assure a rigid and strong body formation. The framing has included therewith a flooring 12 horizontally dividing the body at its upper portion from the lower portion of the same throughout the greater extent of its length while rising from the flooring and a part of the framing are separators or partitions 13 for dividing the upper portion thereof into independent cells or chambers 14 in which are adapted to be fitted gas bags or containers 15, these being supplied through piping 16 with buoyant fluid, for example, helium and other gases and such gas or gases may be supplied from a suitable reservoir located in the lowermost portion of the body of said ship and subjected to pressure so as to assure the functioning of the ship for increasing or decreasing the buoyancy of the same during ascent, descent and in flight.

Arranged centrally of the body A and disposed longitudinally throughout its length is an air conduit or tunnel 17 which opens through the front or nose end 18 and the rear or tail end 19 respectively of said body, while intersecting this conduit or tunnel 17 is a bladed blower wheel 20, the same enclosed in a casing or housing 21 formed with the conduit or tunnel 17 and preferably located intermediate of the ends of the latter which open through opposite extremities of the body. The wheel 20 is operated through connection 22 with a source of power supply 23 preferably an electric motor although the power may be of other kind.

At the forward open end of the conduit or tunnel 17 is a stationary nose mounting 24 having swingingly connected therewith the movable mounting 25 for a front bladed propeller 26, the movable mounting 25 being swingingly connected to the mounting 24 through the pivot 27 which constitutes an axle or arbor for an intermediate gear 28 meshing with companion gears 29 and 30 respectively. The gear 29 is fixed to the propeller shaft 31 while the gear 30 is fixed to the power shaft 32 journaled centrally in the conduit or tunnel 17 by bearings 33 and power is conveyed to this shaft 32 by the connection 34 with a motor 35, the same being suitably supported fore of the body of the craft. The pivot 27 has fixed relation to the movable mounting 25 and connected with this pivot are the throw arms 36, these being projected laterally to opposite sides thereof and have connected to their outer ends operating cables 37, these being extended into the body A to the pilot compartment or room 38 for manual operation by a pilot therein whereby the propeller 26 can be laterally swung to enable the change of course of the craft and aid in the steering of the same.

The conduit or tunnel 17 extended through the center of the body of the ship from its stem to stern permits displacement of air in front of the ship therethrough and out at the rear. The blower wheel 20 effects a forced draft upon the air and thereby setting up a suction at the nose end of the body and in this fashion aiding in drawing the ship forward and thus eliminating head-on resistance. The air forced through the tunnel will heat into the air that comes rushing after the ship and this has a tendency to force ahead the said ship and thereby adding to the speed of the same. The adjustment of the front propeller helps to keep the ship on a straight course and also aids in pulling it ahead.

By the use of helium gas, this being non-explosive, it can be compressed and consequently reduces the lifting power of such gas, thereby enabling the ship to descend. On releasing the gas from the reservoir this will automatically effect a regaining in its lifting capacity and effect the ascent of the ship. The control of the gas may be had in any desirable manner. At the bottom of the ship is arranged a foldable wheeled landing gear equipment 39 so that the ship may be landed on the ground when the gases are compressed and without a mooring mast. The folding of the equipment 39 is for the purpose of permitting the ship to be landed upon a body of water and also for aiding in eliminating resistance when ascending on a take-off of the ship and also during suspension thereof in flight.

Arranged within the body A at opposite sides of the longitudinal center thereof are side tunnels or air conduits 40, these at their forward ends having inlet branches or funnels 41 distributed radially concentrically with respect to the mounting 24 at the nose end of the body while the outlet ends 42 of said tunnels or conduits open laterally through opposite sides of the body and the purpose of these tunnels is to minimize air resistance at the nose end of the ship. The tunnels 40 preferably taper in a forward direction to have the outlet ends 42 of 125 greater extent than the inlet ends of the same. Arranged in each conduit or tunnel 40 is a bladed blower wheel 43, the same being driven from a suitable power source 44 so that air entering the conduits or tunnels will be forced rearwardly and discharged laterally at the discharge ends 42 thereof.

Arranged at the tail end 19 of the body are the rudders 44 and elevators 45 respectively and supported by these are bladed propellers 46, the same being movable with said rudders or elevators and are driven through connections 47 with a source of power supply 48. The rudders 44 are operated by cables 46 carried forwardly within the body A to the control 49 and likewise the elevators are operated by cables 50 carried through the body A to the control 51, thus it being seen that when the rudders 44 and elevators 45 are angularly adjusted the propellers 46 carried thereby will likewise be correspondingly shifted and in this fashion perfect steering of the ship may be had and also assurance of safety in the navigation of said ship. This arrangement of rudders and elevators as well as the correspondingly movable propellers enables the doing away with the carrying of water ballast as generally used at the present time for the purpose of gaining a higher or reaching a lower elevation as the case may be in the maneuvering of the ship. The elimination of the ballast enables a greater load to be carried by the ship.

It is of course to be understood that both fore and aft propellers may be of the double action blades, forward and reverse or they may have three or four blades in their construction. The body A of the ship is equipped with doors 52 whereby ingress and egress to and from the ship may be had while leading from the flooring 12 upwardly to a passenger's room or compartment 53 is a ladder 54 for convenience to passengers in reaching said compartment 53 on entrance to the ship. Access by ladders 55 from the upper portion of the body A of the ship to the lower portion thereof is had.

Located intermediate of the body A of the ship and longitudinally disposed thereof is a keel 56 swingingly supported at 57 and movable in a way 58 formed in said body so that the keel may be lowered within the way for the projecting of the same beneath the bottom of the body when the latter has made a landing upon a body of water and in this fashion keep the ship on a straight keel when afloat upon the water. The keel 56 is controllable by a cable 59 manually operated for the elevation of said keel into the way 58 and the projecting of such keel beneath the bottom of the body of the ship.

The wall of the compartment 53 is windowed for observation purposes, while the body of the ship may be windowed as may be found desirable.

The body A of the ship inwardly of its outer skin 10 in the upper portion of said body has built therein a dead air space 61 which functions to eliminate temperature disturbance from without the ship with respect to the gas within the bags or containers 15 in the compartments or chambers 14 of said body.

In Figures 14 and 15 of the drawings there is shown a slight modification in the arrangement and construction of the side conduits or tunnels 62 wherein the inlet funnels or branches of the same are of curvilinear formation and disposed circularly about the nose end of the body A of the ship.

What is claimed is:

1. In a ship of the character described, a dirigible body, elevators arranged at the rear end of said body, rudders arranged at the rear end of the body above and below the same, driven shafts journaled in said body and constituting hinge pintles for said elevators and rudders, bladed rotary propellers having shafts journaled on the elevators and rudders, gear connections between the first and last-named shafts, and controls, operable from within the body for the shifting of the elevators and rudders.

2. In a ship of the character described, a dirigible body, elevators arranged at the rear end of said body, rudders arranged at the rear end of the body above and below the same, driven shafts journaled in said body and constituting hinge pintles for said elevators and rudders, bladed rotary propellers having shafts journaled on the elevators and rudders, gear connections between the first and last-named shafts, controls operable from within the body for the shifting of the elevators and rudders, and power means within the body and having connection with the first-named shafts for the driving of said propellers.

DONALD MACKENZIE.